Aug. 10, 1954     E. WILDHABER     2,685,784
UNIVERSAL JOINT DRIVE
Filed Oct. 26, 1949                                          4 Sheets-Sheet 1

INVENTOR.
ERNEST WILDHABER
BY
ATTORNEY

INVENTOR.
ERNEST WILDHABER
BY
ATTORNEY

INVENTOR.
ERNEST WILDHABER

Aug. 10, 1954  E. WILDHABER  2,685,784
UNIVERSAL JOINT DRIVE
Filed Oct. 26, 1949  4 Sheets-Sheet 4
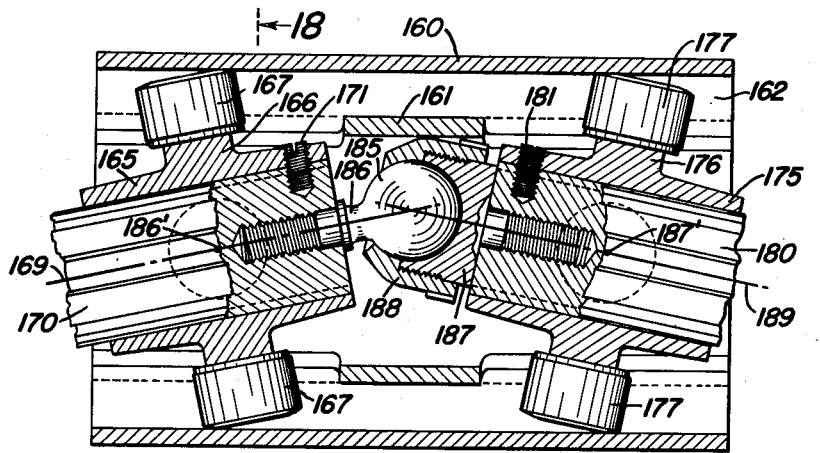
FIG. 16.
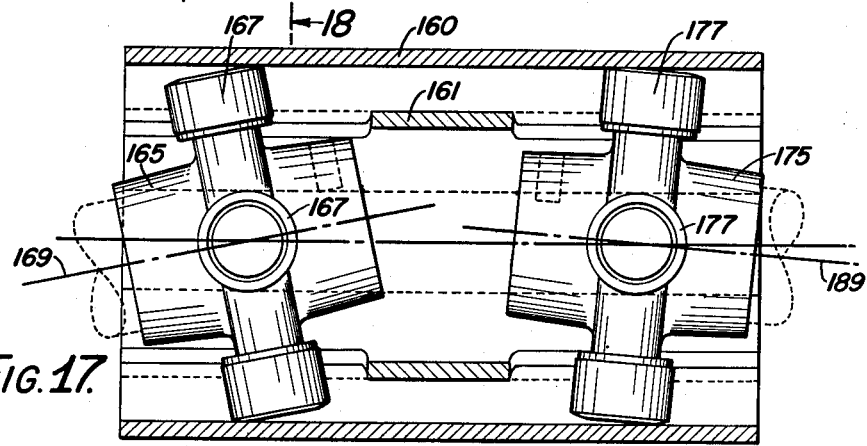
FIG. 17.
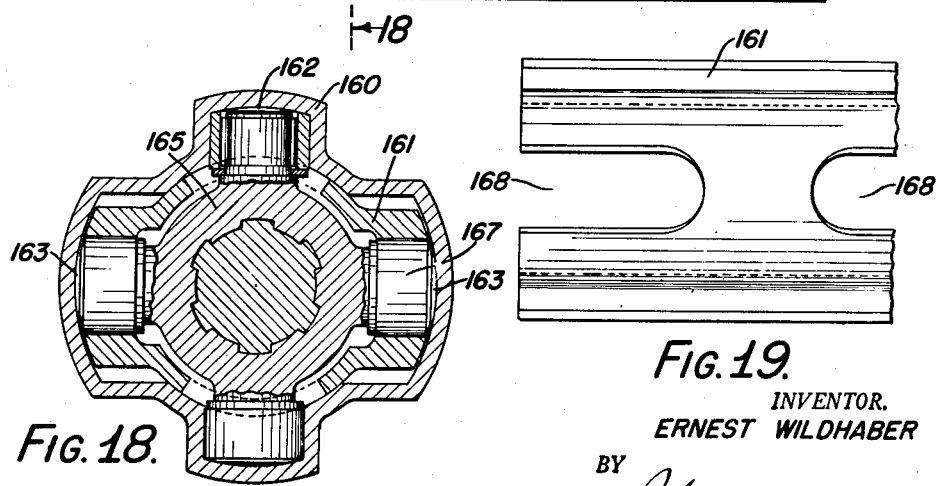
FIG. 18.
FIG. 19.
INVENTOR.
ERNEST WILDHABER
BY
ATTORNEY Patented Aug. 10, 1954

2,685,784

UNITED STATES PATENT OFFICE 2,685,784

UNIVERSAL JOINT DRIVE

Ernest Wildhaber, Brighton, N. Y.

Application October 26, 1949, Serial No. 123,561

22 Claims. (Cl. 64—21)

The present invention relates to universal joint drives. In a more particular aspect, the invention relates to universal joint drives of the type disclosed in my pending application Serial No. 102,788, filed July 2, 1949.

In my above mentioned application, I have disclosed a universal joint drive in which two or more Cardan type joints are used in parallel to connect two shaft members, that is, part of the energy or torque is transmitted from one shaft to the other through one Cardan type joint and another part of the energy or torque is transmitted through the other joint. The torque or energy transmitted from one joint does not go through the other joint.

Cardan type joints are simple in design but do not transmit true uniform motion. The transmitted motion has a periodic acceleration and deceleration and fluctuates increasingly with increase in the angle between the connected shafts. At one phase in the rotation of the joint there is an advance over uniform motion position; at another phase there is a lag. The variation in motion repeats with every half revolution of the shafts.

In the invention of my above mentioned application the two Cardan type joints used in parallel between the two intersecting shafts are designed to be at different phases, particularly at phases 90° apart. The fluctuations produced are then opposite and approximately equal. An equalizer is then used to combine and average the motion transmitted through the two joints. This combined, averaged motion is practically uniform even at large shaft angles.

One object of the present invention is to provide an improvement and modification of the universal joint drive of my above mentioned application which is particularly suitable for small shaft angles.

Another object of the invention is to provide a universal joint drive of the type described having a form of equalizer which is especially advantageous for use at moderate shaft angles, namely, at shaft angles smaller than 30° and especially at shaft angles of 20° and less.

A further object of the invention is to provide a new universal joint of high load capacity having two Cardan type joints arranged in parallel and using a new and simple equalizer.

Cardan type universal joints made up of an external member and of an internal member are known. The external member may have a pair of coaxial rollers mounted at opposite ends on a radial axis. The internal member may have plane side surfaces to contact with said rollers and which extend along the axis of the internal member. An important further object of the present invention is to provide a joint of this character having increased load capacity.

Another object of the invention is to provide a drive that is so constructed as to reduce or avoid the fluctuations in the motion transmitted through such a joint.

Another object of the invention is to provide a universal joint having a pair of coaxial internal members which are movable relative to one another about a common axis.

A further object of the invention is to provide a universal joint drive having two axially spaced joints of the character mentioned in which the internal members of each pair are rigidly connected.

Still another object of the invention is to provide a universal coupling with this last described construction which will take an ample amount of angular misalignment as well as radial and axial misalignment.

A still further object of the invention is to provide a novel equalizer which is simple in design and which is based on linkage.

Other objects of the invention will be apparent hereinafter from the specification and from the recital of the appended claims.

In the drawings:

Fig. 16 is an axial sectional view, with parts broken away, showing an embodiment of the invention having no equalizer but comprising a pair of coaxial internal members which are rotatable with respect to one another;

Fig. 17 is an axial sectional view of a further embodiment of the invention using two joints;

Fig. 18 is a transverse sectional view such as might be taken on the line 18—18 of either Fig. 16 or Fig. 17 when the shafts are in axial alignment; and Fig. 19 is a fragmentary elevational view on a reduced scale of the internal sleeve member of either of the embodiments shown in Fig. 16 or 17.

Figure 1:
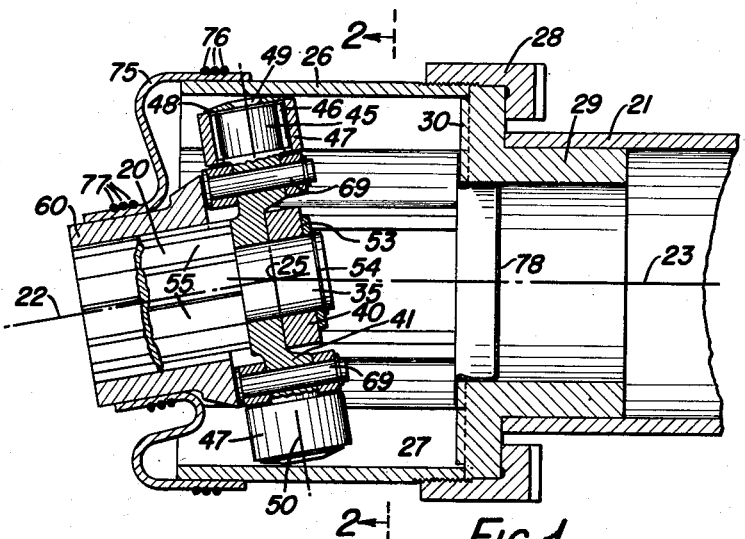
Fig. 1 is an axial sectional view through a joint constructed according to one embodiment of the invention.
Figure 5:
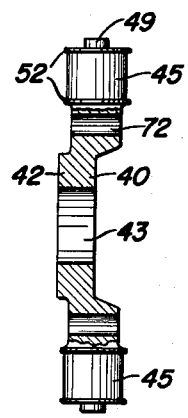
Fig. 5 is a part axial section, part elevational view of one of the roller carriers used in this joint.

Reference will now be had first to the embodiment of the invention shown in Figs. 1 to 8 inclusive. Here, 20 and 21 denote, respectively, the two rotary elements or shafts which are to be connected by the universal joint drive of the present invention. The axes of these elements are denoted at 22 and 23, respectively. They intersect in point 25. A sleeve member 26 is connected to the element 21. This connection is through a flanged nut 28, which secures sleeve 26 to an annular member 29 that is welded or otherwise secured to the tubular shaft 21. The part 29 is formed with short-tooth-like face projections 30 which fit into the right hand ends of the four internal equi-spaced axial grooves or channels 27 formed in the sleeve 26. Thus, sleeve 26 is held against rotation relative to part 29 and shaft 21. The grooves or channels 27 have plane sides 31.

The shaft 20 has a reduced stub portion 35 at its inner end. On this are mounted two roller carriers 40 and 41 that are coaxial with shaft 20 and that are rotatable relative to each other about the axis 22 of that shaft. The two roller carriers are identical in construction and the construction of only one of them be described, therefore, in detail.

Each carrier has a hub portion 42 (Figs. 4 and 5) that is bored at 43 to fit on the stub portion 35 of the shaft 20; and each carrier has two diametrically disposed arms 44 which are formed with journals 45. Mounted on each of these journals 45 by means of antifriction pin bearings 46 is a roller 47. The coaxial pins 45 of each roller carrier serve as the race for the rollers or needles 46 on which rollers 47 are mounted. The rollers 47 themselves form the outer races of these needle bearings. These rollers are held in place without preload by the caps 48 which are riveted to the pin member or roller carriers, the stumps 49 of the pins 45 being deformed into rivets by pressure, after the needles and rollers are in place, and after the caps have been applied. The journals 45 have terminal flanges 52 which serve to hold the pins 46 against axial movement.

The common axis 50 of the rollers 47 is perpendicular to the axis 22 of shaft 20. The two roller carriers 40 and 41 are mounted coaxially on the stub shaft 35 to oscillate thereon in a fixed axial position between a washer 53, which is secured in place by a snap ring 54, and a shoulder formed on the shaft 20.

The two rollers 47 of the carrier 40 are adapted to engage in two diametrically disposed grooves 27 of the sleeve member 26; and the two rollers 47 of the other carrier 41 engage in the other two diametrically disposed grooves 27 of the sleeve 26.

The two carriers are operatively connected with the drive shaft 20 through an equalizer which will now be described. The shaft 22 has external splines 55. Mounted upon the shaft 20 and rigidly connected with it through its splines is a spider 60. This member has internal splines 61 (Fig. 3) which engage with the splines of the shaft. The spider has four radially disposed, axially-projecting arms 62 which are equi-angularly spaced about its axis. These arms have radial slots 63 (Fig. 4) formed internally in them which have parallel plane side surfaces 65.

Figure 2:
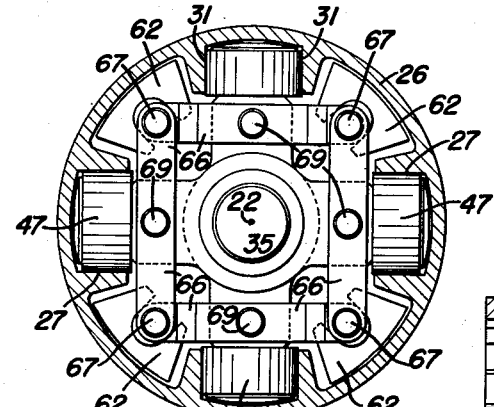
Fig. 2 is a sectional view such as might be taken on the line 2—2 of Fig. 1 when the two axes of the joint are in axial alignment.
Figure 3:
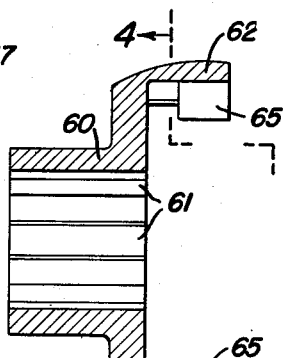
Fig. 3 is an axial sectional view of the spider member used in this joint.
Figure 6:
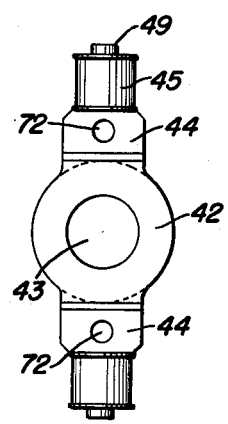
Fig. 6 is a view taken at right angles to the view of Fig. 5.
Figure 4:
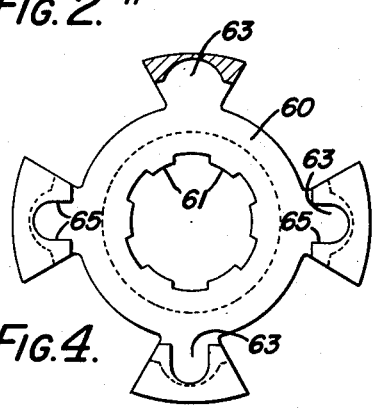
Fig. 4 is a sectional view on the line 4—4 of Fig. 3.
Figure 7:
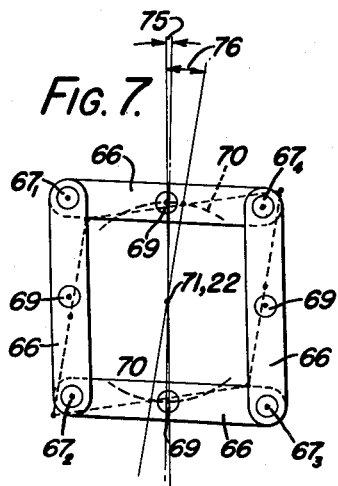
Fig. 7 is a diagrammatic view showing the operation of the equalizing linkage of this joint.
Figure 8:
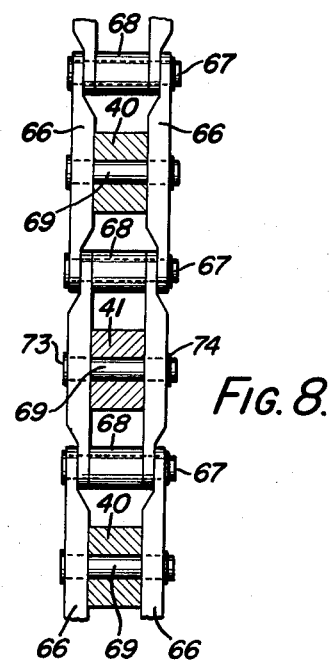
Fig. 8 is a developed view of said linkage.

A linkage comprising four pairs of links 66 connects the spider 60 with the roller carriers 40 and 41. The two members of each pair of links are parallel to one another. Adjacent pairs of links are connected at their ends by pins 67 (Figs. 2, 7 and 8). Mounted on these pins are cylindrical rollers 68. These rollers engage in the radial slots 63 of the spider 60. Each pair of links is connected to one of the roller carriers 40 or 41 by a pin 69. Each pin has a press fit in the pair of links with which it cooperates, and engages in a hole 72 in an arm 44 of a roller carrier. It is held axially therein by a head 73 and a small snap ring 74 or other known means. The axes of the pins 69 are parallel to the axis 22 of shaft 20 and intersect the roller axis 50. The links are so connected with the roller carriers that all the pins 69 have an equal distance from the axis 22 of drive shaft 20. At their ends, the widths of the links are reduced to about half. Adjacent links overlap at the ends, therefore, without adding any overall width of the chain. The pins 67 connect adjacent links and also carry the rollers 68.

The operation of this linkage is best seen in Fig. 7. The four links form a parallelogram, having pivots 67. Each pin 69 is midway between and in line with a pair of pins 67. Since the rollers 68 engage in the radial slots 63 of the spider 60 they are constrained to move in equi-spaced straight radial paths. As the diametrically opposite pins $67_1$, $67_3$ move outwardly, then, the other pair of diametrically opposite pins $67_2$, $67_4$ move inwardly, and vice versa. In the mean position the four links form a square. When pins $67_1$, $67_3$ move outwardly and pins $67_2$, $67_4$ move inwardly, a parallelogram is formed with acute angles at $67_1$ and $67_3$ and obtuse angles at $67_2$ and $67_4$.

It is a known fact that in a motion of this kind the centers of the pins 69 describe circular arcs 70 about the center 71 of the parallelogram. This center is on the axis 22 of the shaft 20. In other words, as the pins 67 move radially in or out, toward or from the center 71, the pins 69 move about the axis 22 of the element 20 and of spider 60.

The links are shown in Fig. 7 turned through a slight angle 75 from mean position. The dotted lines in this figure show another position of the pins when they are turned through an exaggerated angle to the opposite side of the mean position, 76 denoting the angle through which they are turned to the opposite side.

It is seen that this linkage permits the required motion of the roller carriers forward and back about the axis 22 of the spider. By placing the pins 69 in line with a pair of pins 67, a link member may be made all in one piece and extend all of the way between two adjacent pins 67. This renders it unnecessary to use two different links between adjacent pins 67 pivoting about the intermediate pin 69. It will also be seen that the connecting lines of diametrically opposite pins 67 are always perpendicular to each other and that the pins 69 are symmetrically positioned with reference to the two connecting lines. The angular advance 75 of one roller carrier always equals the angular lag of the other roller carrier as compared with the motion of the spider. In other words, the spider 60 moves at the average motion, and the combined parts constitute an equalizer.

In analyzing the transmitted motion it is convenient to start out from the motion of the element 21 even though this may be the driven member. The motion of the element 20 is then determined for a uniform motion of element 21 and of the sleeve 26 which is secured to the element 21 to rotate therewith. When the motion of element 20 is found to be uniform, then uniform motion will be transmitted from the element 20 to the element 21. Whatever slight departures from uniform motion exist, exist also when the element 20 is the driver and turns at a uniform rate. The departures are then those of the element 21.

Each roller carrier with its rollers and their contact with the sleeve 26 acts like a Cardan type universal joint. The motion transmitted thereby is exactly like the motion transmitted in a Cardan joint of the same shaft angularity. This motion is nearly uniform for moderate shaft angles but begins to vary and fluctuate more and more with increase in the shaft angles. The fluctuations repeat with every half revolution. They change substantially like a sine curve. The positions of advance and lag are 90° apart. An exact analysis of this motion is presented in my abovementioned application.

As the grooves 27 of the sleeve 20 are 90° apart, the two roller carriers 40 and 41 in the drive of the present invention are in the opposite phase. The average motion of the two roller carriers is, therefore, very nearly uniform. The variation in motion transmitted by one roller carrier is substantially offset by the variation in motion transmitted by the other roller carrier. At a shaft angle of 10°, the maximum advance or lag from uniform motion position is 26' for a Cardan joint, but for the two Cardan joints disposed in opposite phase as described it is zero (or 0.1'). At a shaft angle of 20° the maximum advance or lag is 1° 47' for each Cardan joint and 1.7' for the motion averaged in accordance with my invention. In other words, substantial uniformity of motion is achieved.

The joint shown in Figs. 1 to 8 permits axial displacement of the shaft element 21 within the limits of the design. This is desirable in many cases as on the propeller shaft and other shafts of an automotive vehicle. Moreover, this joint has a large load capacity on account of its four rollers. Furthermore the equalizer constrains the four rollers to share the load equally.

In the drive shown, the driving load is transmitted through the equalizing linkage, the pins 69, the pins 46, and the rollers 47. The stub shaft 35 serves merely for centering. Hence, we have a constant velocity joint of relatively simple design, having a minimum of friction loss, which does not heat up, and which can be easily made to outlast the vehicle, in which it is used, and which requires little, if any, service.

A seal 75 (Fig. 1) serves to keep out dust and dirt and to keep in grease. The seal 75 may be made of a suitable elastic material, such as a synthetic rubber which is unaffected by oil and grease. One end of the seal may be secured by wire coil 76 or other means to the sleeve 26; and the other end of the seal may be secured by a wire coil 77 or other suitable means to the spider 60. The inside of the sleeve 26 is sealed off from the tubular shaft 21 by a cup-shaped insert 78 which is fastened in any suitable manner to the hub member 29 and which may be made of sheet metal. Thus the joint is effectively sealed on both sides by seals 75 and 78. With a joint constructed according to the present invention, greasing presents less of a problem than in known constant velocity joints because of the rolling contact of the rollers 47 on their pins 46 and on the straight races formed by the sides 31 of the grooves 27 of the sleeve 26, and because of the small amounts of motion performed by the equalizing linkage.

Figure 9:
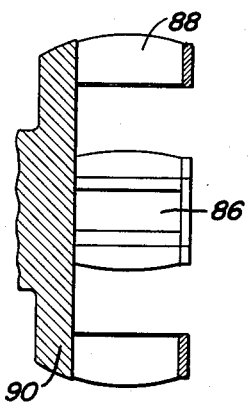
Fig. 9 is a sectional view, similar to Fig. 3, but showing a spider for a modified form of joint.
Figure 10:
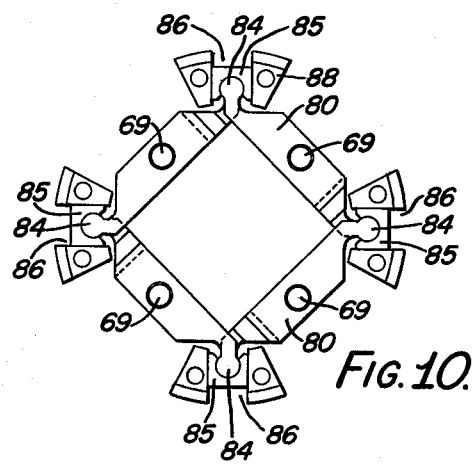
Fig. 10 is a view, similar to Fig. 4, showing the modified form of linkage and spider employed in this embodiment of the invention.
Figure 11:
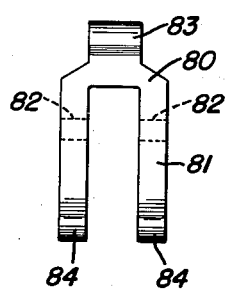
Fig. 11 is a side view of one of the equalizing links used in this joint.

Various forms of equalizing linkages may be used in universal joint drives constructed according to the present invention. A modified form of linkage is shown in Figs. 9 to 11 inclusive. Here the link members 80 are made of Y-shape. Each link member is provided at one end with a rounded projection 83 and each link member has two parallel legs or furcations 81 that terminate in rounded projections 84. The legs or furcations 81 are bored, as denoted at 82, to receive the pins 69 by which the link member is connected to the roller carriers 40 and 41.

The projections 83 and 84 are equivalent to the rollers 68 of the first described embodiment of the invention. These rounded, cylindrical end portions 83 and 84 engage in sliding blocks 85 that are capable of sliding in radial slots 86 formed in the axially projecting arms 88 of a spider member 90. A rounded portion 83 of one link member and the rounded portions 84 of the adjacent link member engage in the slot 86 of each block 85. Thus, the sliding blocks 85 connect adjacent link members with the spider 90. The pins 69 which connect the link members with the roller carriers 40 and 41 are secured axially as before. Again, the spider is rigidly connected with the drive shaft or driven shaft. The roller carriers are not shown. They may be centered on each other without direct connection with the spider or with the shaft to which the spider is secured. Centering and axial alignment may be accomplished through the linkage. If desired, however, the roller carriers may be mounted on the element 20 as in the previously described embodiment of the invention.

Figure 12:
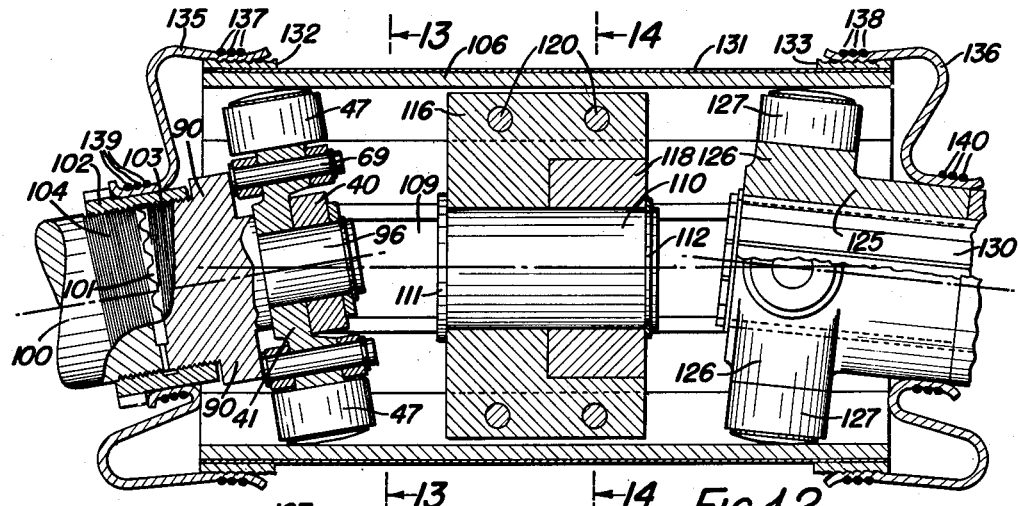
Fig. 12 is an axial sectional view of a further embodiment of a universal joint drive made according to the present invention, parts of the drive being shown partly in elevation.
Figure 13:
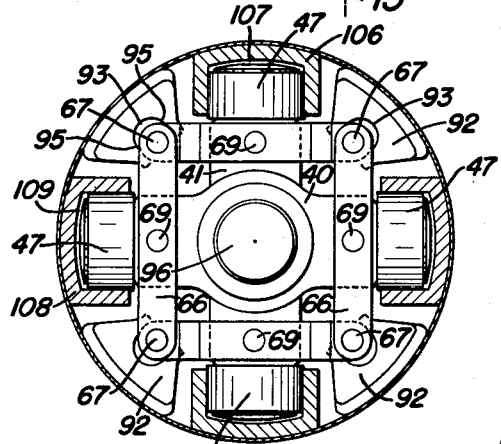
Fig. 13 is a section such as might be taken on the line 13—13 of Fig. 12 when the shafts are in axial alignment.
Figure 14:
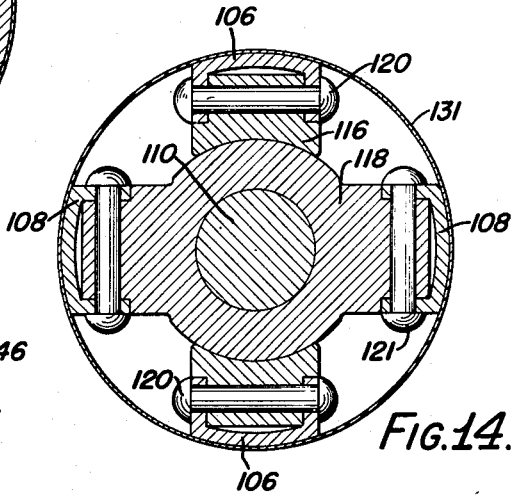
Fig. 14 is a section on the line 14—14 of Fig. 12 looking in the direction of the arrows.

The equalizer based on linkage is one of the principal features of the invention. It is, however, not the only feature of the invention. Figs. 12 to 14 inclusive illustrate an embodiment of the invention with all of the features of the invention present. Here a universal joint drive is shown with two joints capable of transmitting uniform motion. This embodiment can be considered a universal coupling which is capable of taking angular as well as linear misalignment or eccentricity between the two end members connected thereby.

At the left in Fig. 12 is a universal joint of the same general character as shown in Fig. 1. It comprises two roller carriers 40 and 41 that are operatively connected with a spider member 90 through a linkage such as illustrated in Figs. 1 to 8 inclusive. The spider member is substantially of the same construction as the spider member 60, having arms 92 (Fig. 13) which have slots in them that have plane sides 95. The roller carriers 40 and 41 are here mounted with their hub portions on a stub shaft 96 which forms part of the spider member 90. The spider is rigidly connected to the shaft 100 by a toothed face coupling 101 and by the nut 102 which threads onto both the spider member and the shaft, the threaded portions 103 and 104 of the spider and the shaft being, respectively, of opposite hand, and the cooperating internally threaded portions of the nut 102 being correspondingly of opposite hand.

Here, the two coaxial rollers 47 of the roller carrier 41 engage in the plane sided channels or grooves 107 of a pair of diametrically disposed U-shaped bars or channel members 106 while the two coaxial rollers 47 of the roller carrier 40 engage in the plane sided channels or grooves 109 of a separate pair of diametrically disposed U-shaped bars or channel members 108.

The two channel members 106 are secured midway of their lengths to a block 116. The two channel members 108 are secured midway of their lengths to a block 118 (Fig. 14). The blocks 116 and 118 fit into the grooves or channels 107 and 109, respectively, of the channel members 106 and 108, respectively, at points midway the length of the channel members, as shown in Fig. 14, and are rigidly secured to the channel bars by rivets 120 and 121. The blocks 116 and 118 are recessed to receive one another; and the blocks are mounted to be coaxial and are movable relatively to one another about their common axis. They are centered by a bolt 110 and are held together axially by the head 111 of the bolt and through the snap ring 112. Other designs may also be employed. The main feature is that here the two sleeves or channel members are separate and movable relative to one another.

The channel members project equally in axial direction on both sides of the connecting blocks 116 and 118. The rollers 47 engage the channels adjacent one end of the channel members. Adjacent their opposite ends, the channel members are engaged by rollers 127 that are all mounted on the four radial arms of a common roller carrier 125, which is rigidly secured by splines to a coaxial shaft 130.

A thin-walled tube 131 surrounds the channel members 106 and 108. If desired, this tube may be connected to one of the channel bars. For added stiffness rings 132 and 133 may be welded to the tube 131 at opposite ends thereof. Elastic seals 135 and 136 similar to the seal 75 are tightly secured to these rings by coiled wires 137 and 138. These seals are secured at their opposite ends to the nut 102 and the roller carrier 125, respectively, by coiled wires 139 and 140, respectively.

The universal joint drive of Figs. 12 and 14 inclusive, with two spaced universal joints transmits substantially uniform motion. Uniform motion of shaft 130 causes the two channel members to advance and lag from uniform motion about equally and in opposite directions. The two roller carriers 40 and 41 also advance and lag from uniform motion about equally and in opposite directions. The spider 90 and the end member or shaft 100 move, therefore, at the average rate of the two carriers, that is, uniformly. In other words, and as pointed out in my above mentioned application, a single equalizer may be used for both joints of the universal joint drive, and may make the drive a uniform motion drive. There is no restriction as to the shaft angularity between the two spaced joints of the drive. The shaft angles may be equal or unequal and may be in the same or opposite directions. In all cases uniform motion is achieved.

Figure 15:
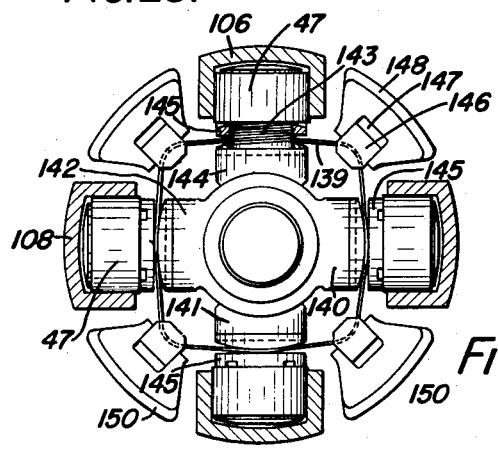
Fig. 15 is a sectional view corresponding to that of Fig. 13 but showing a further embodiment of the invention.

A modified form of equalizer is shown in Fig. 15. Here a tape 139 is used instead of the chain links. The tape has four equi-angularly spaced holes in it through which the radial-projecting roller-carrying arms 142 and 143 of the roller carriers 140 and 141 extend. The tapes are tightly pressed onto rounded supporting flanges 144, which are integral with the arms, by nuts 145 which thread onto the arms. The tape engages, between arms 142 and 143, in sliding blocks 146. These blocks engage in plane sided radial slots 147 of the arms 148 of a spider member 150. The action of this tape equalizer is very similar to the action of the previously described equalizers having pivoted links. Here the elasticity of the tape substitutes for the pivots. Here, also, the turning motion of the spider member is the average of the turning motion of the two coaxial roller carriers 140 and 141.

Further embodiments of the invention are illustrated in Figs. 16 to 18 inclusive. These embodiments do not employ equalizers. Here, there are a pair of coaxial channel members 160 and 161 which are movable relative to one another about their common axis and which contain straight-sided internal channels or grooves 162 and 163, respectively. These members are held in axial alignment by any suitable known means.

The total of the four channels of the two members 160 and 161 are engaged adjacent one end by four rollers 167 mounted on the four radial arms 166 of a roller carrier 165. Diametrically opposite rollers are mounted coaxially; and the two axes of the two pairs of rollers intersect at the axis 169 of the roller carrier. This is also the axis of the shaft 170 to which the carrier is secured by splines. The axial position of the roller carrier is fixed by the set-screw 171.

Adjacent their opposite ends the four channels or grooves 162 and 163 of the members 160 and 161 are engaged by four rollers 177 carried by the four radial arms 176 of a roller carrier 175. This carrier is identical with the carrier 165 and is rigidly secured by splines to the other shaft 180 of the drive as by means of a set-screw 181. The inner member 161 of the two tubular members is slotted from both ends as denoted at 168 (Fig. 9) so that it may be assembled with reference to the two roller carriers.

In the embodiment of Fig. 16 the two shafts have a further operative connection. They are connected by a ball joint disposed midway between the centers 186' and 187' of the two universal joints. The intermediate joint comprises a ball 185 which has a stud portion 186 that threads into the inner end of the shaft 170. This ball portion fits into a socket member 187 that threads into the shaft 180. The ball and the socket member are held in engagement by a nut 188 that fits over the ball and threads onto the socket member.

With this construction, the axes 169, 189 of the two shafts 170 and 180 are constrained to stay in the same plane and the shaft angles of the two joints are equal. The result is a constant velocity joint of the type using two Cardan joints in series. This present joint differs from known joints of this type, however, in that a pair of relatively movable connecting members are used which in turn permits of use of twice as many rollers to give increased load capacity, or to give for a given load capacity a joint of smaller size and smaller weight.

In the embodiment of the invention illustrated in Fig. 17, there is no intermediate ball joint connection between the two shafts, but the structure is otherwise the same as in the embodiment of Fig. 16. Its roller carriers 165, 175 are the same and the pair of channel members 160, 161 with the internal channels 162, 163 are the same. This embodiment is a universal coupling achieving certain of the objects of the present invention. The freedom of the two channel members to turn relative to each other on their common axis adds materially to the uniform motion characteristics of the universal coupling. The four roller contacts simultaneously used in a joint made in accordance to the present invention has the further advantage, as in other embodiments of the invention, that they automatically center the engaged channel member or members through the drive contact itself without addition of further structure. This further adds to the compactness of the drive.

While the invention has been described in connection with several different embodiments thereof, it will be understood that it is capable of further modification. This application is intended to cover any variations, uses, or adaptations of the invention, following, in general, the principles of the invention and including such departures from the present disclosure as come within known or customary practice in the art to which the invention pertains and may be applied to the essential features hereinbefore set forth and as fall within the scope of the invention or the limits of the appended claims.

Having thus described my invention, what I claim is:

1. A universal joint comprising a pair of coaxial roller holders mounted to be rotatable relative to one another about their common axis, a pair of rollers mounted on each holder for rotation about an axis intersecting the axis of said holder, a plurality of pairs of straight ways disposed about a common axis, each pair of ways being engaged by one pair of said rollers, a spider member coaxial with said roller holders, and links pivotally mounted on the roller holders at points midway of their lengths and connecting the roller holders to the spider member.

2. A universal joint comprising a pair of coaxial roller holders mounted to be rotatable relative to one another about their common axis, a pair of rollers mounted on each holder for rotation about an axis intersecting the axis of said holder, two pairs of straight ways disposed about a common axis, each pair of ways being engaged by one pair of said rollers, a spider member coaxial with said roller holders, said spider member having four arms with internal radial slots formed therein, and an equalizer for connecting said spider member and the roller carriers, said equalizer comprising members movable radially in said slots and means connecting said members with said roller holders.

3. A universal joint comprising a pair of coaxial roller holders mounted to be rotatable relative to one another about their common axis, each of which has two diametrically opposite arms, a pair of rollers mounted on the two arms of each holder for rotation about an axis intersecting the axis of said holder, two pairs of straight ways disposed about a common axis, each pair of ways being engaged by one pair of said rollers, a spider member coaxial with said roller holders, said spider member having four arms, each of which has a radially disposed slot therein, and an equalizer for connecting said spider member and the roller carriers, said equalizer comprising a plurality of links, each of which is pivotally connected intermediate its ends to an arm of a roller holder, and each of which is pivotally connected at its opposite ends to two other of said plurality of links, and a roller carried at the point of pivotal connection of each two links which is arranged to engage in the slot in one arm of the spider.

4. A universal joint comprising a pair of coaxial roller holders mounted to be rotatable relative to one another about their common axis, each of which has two diametrically opposite arms, a pair of rollers mounted on the two arms of each holder for rotation about an axis intersecting the axis of said holder, two pairs of straight ways disposed about a common axis, each pair of ways being engaged by one pair of said rollers, a spider member coaxial with said roller holders, said spider member having four arms, each of which has a radially disposed slot therein, and an equalizer for connecting said spider member and the roller carriers, said equalizer comprising a plurality of links, each of which is pivotally connected intermediate its ends to an arm of a roller holder, and each of which has rounded portions at its opposite ends, a block slidably mounted in each arm of the spider and having a rounded recess therein adapted to receive the opposite rounded ends of two adjacent links.

5. A universal joint comprising a pair of coaxial roller holders mounted to be rotatable relative to one another about their common axis, each of which has two diametrically opposite arms, a pair of rollers mounted on the two arms of each holder for rotation about an axis intersecting the axis of said holder, two pairs of straight ways disposed about a common axis, each pair of ways being engaged by one pair of said rollers, a spider member coaxial with said roller holders, said spider member having four arms, each of which has a radially disposed slot therein, and an equalizer for connecting said spider member and the roller carriers, said equalizer comprising a flexible tape having holes therein through which the arms of the roller holders extend, and blocks secured to said tape between said roller-holder arms, which blocks engage in the slots in the spider arms.

6. A universal joint comprising a spider member and a channel member whose axes intersect, two roller carriers mounted coaxial with the spider member to move relative to one another and relative to the spider member about their common axis, each roller carrier having two diametrically opposite arms which project radially outwardly from its axis, a pair of coaxial rollers mounted on the arms of each roller carrier, said channel member having guide channels formed internally therein which extend axially of said member in which the rollers engage, and an equalizer for interconnecting the spider member and the roller carriers, said equalizer comprising four links which are pivoted, respectively, on the four arms of the roller carriers for pivotal movement about parallel axes, and means connecting the links to the spider member.

7. A universal joint comprising a spider member and a channel member whose axes intersect, said channel member having four guide channels formed internally therein whose sides are plane and extend axially of the channel member, two roller carriers mounted coaxial with the spider member and adapted to move relative to one another and to said spider member about the axis of said spider member, each roller carrier having two diametrically opposite arms which project radially outwardly from its axis, a roller journaled on each arm of each roller carrier, the two rollers of each carrier being coaxial, said rollers engaging in respectively different guide channels of the channel member, and an equalizer for interconnecting the spider member and the roller carriers, said equalizer comprising a plurality of links, each of which is pivoted at a point between its ends on an arm of a roller carrier, each of said links being operatively connected at its opposite ends to the spider member.

8. A universal joint drive comprising two spaced end members, a pair of coaxial intermediate connecting members movable relative to one another about their common axis and both extending from one of said end members to the other, each connecting member having a pair of diametrically opposite guide channels, each of which has parallel plane sides, four rollers mounted on one end member to engage in said guide channels and to rotate about axes which extend radially of and intersect the axis of said end member, and four rollers mounted on the other end member to engage in said guide channels and to rotate about axes which extend radially of and intersect the axis of said other end members.

9. A universal joint drive comprising two spaced end members, a pair of coaxial intermediate connecting members movable relative to one another about their common axis and both extending from one of said end members to the other, each connecting member having a pair of diametrically opposite guide channels, each of which has parallel plane sides, four rollers mounted on one end member to engage in said guide channels adjacent one end thereof and to rotate about axes which extend radially of and intersect the axis of said end member, and four rollers mounted on the other end member to engage in said guide channels adjacent the other end thereof and to rotate about axes which extend radially of and intersect the axis of said other end member, and separate means for further connecting said end members with each other to maintain said end members at equal angles to the axis of said connecting members.

10. A universal joint drive comprising two spaced end members, a pair of coaxial intermediate connecting members movable relative to one another about their common axis and both extending from one of said end members to the other, each connecting member having a pair of diametrically opposite guide channels, each of which has parallel plane sides, four rollers mounted on one end member to engage in said guide channels adjacent one end thereof and to rotate about axes which extend radially of and intersect the axis of said end member, and four rollers mounted on the other end member to engage in said guide channels adjacent the other end thereof and to rotate about axes which extend radially of and intersect the axis of said other end member, and a ball joint connecting said end members at a point midway between the two sets of rollers which are mounted on the two end members, respectively.

11. A universal joint drive comprising two end members, a pair of coaxial intermediate connecting members movable relative to one another about their common axis, each connecting member having a pair of diametrically opposite guide channels which extend axially of the member, four rollers mounted on one end member to engage in said guide channels and to rotate about axes which extend radially of and intersect the axis of said one end member, a pair of roller carriers mounted on the other end member to move relative to one another and to said end member about the axis of said end member, a pair of rollers mounted on each of said roller carriers to rotate about axes extending radially of and intersecting the axis of said end member, the rollers carried by said roller carriers also engaging in said guide channels, and means operatively connecting the roller carrier and said other end member.

12. A universal joint drive comprising two end members, a pair of coaxial intermediate connecting members movable relative to one another about their common axis, each connecting member having a pair of diametrically opposite guide channels which extend axially of the member, four rollers mounted on one end member to engage in said guide channels and to rotate about axes which extend radially of and intersect the axis of said one end member, a pair of roller carriers mounted on the other end member to move relative to one another and to said other end member about the axis of said other end member, a pair of rollers mounted on each of said roller carriers to rotate about axes extending radially of and intersecting the axis of said other end member, the rollers carried by said roller carriers also engaging in said guide channels, and equalizing means interconnecting the roller carriers and said other end member to transmit the average motion of said roller carriers to and from said other end member.

13. A universal joint drive comprising two end members, a pair of coaxial intermediate connecting members movable relative to one another about their common axis, each connecting member having a pair of diametrically opposite guide channels which extend axially of the member, four rollers mounted on one end member to engage in said guide channels and to rotate about axes which extend radially of and intersect the axis of said one end member, a pair of roller carriers mounted on the other end member to move relative to one another and to said end member about the axis of said end member, a pair of rollers mounted on each of said roller carriers to rotate about axes extending radially of and intersecting the axis of said end member, the rollers carried by said roller carriers also engaging in said guide channels, and equalizing means interconnecting the roller carriers and said other end member, said equalizing means comprising four links, two of which are pivotally mounted intermediate their ends on one roller holder and the other two of which are pivotally mounted intermediate their ends on the other roller holder, and means operatively connecting the opposite ends of each link with said other end member.

14. A universal joint drive comprising two end members, a pair of coaxial intermediate connecting members movable relative to one another about their common axis, each of said connecting members comprising a central portion and two channel members which are secured to the central portion at diametrically opposite sides thereof, each of said channel members projecting axially at both sides beyond said central portion and having an internal guide channel formed therein which extends axially of the common axis of the channel members, a roller carrier secured to one end member and having four radially projecting arms equi-spaced about its axis, a roller mounted on each arm in engagement with a guide channel, two roller carriers mounted on the other end member coaxial therewith to move relative to one another and to said other end member about a common axis, each of said two last-named roller carriers having a pair of diametrically opposite arms projecting outwardly therefrom, a roller mounted on each of said diametrically opposite arms, to engage each in a different guide channel of said two channel members, and equalizing means comprising a linkage connected to the two last-named roller carriers and having portions which are connected to said other end member to move radially thereof.

15. An equalizer for universal joints comprising a rotatable spider, two members coaxial therewith and movable relative to one another about the axis of said spider, and a plurality of links pivotally connected to said two members and to one another and to the spider for transmitting the average motion of the two members to the spider, the pivots of said links being all parallel to the axis of said spider.

16. An equalizer for universal joints comprising a rotary member with four radial slots spaced about its axis, two members mounted coaxial therewith to move relative to one another and to said first member about their common axis, a pair of links pivoted on each of said two coaxial members at points midway of their lengths, the axes of pivotal movement of said links being parallel, said links forming a closed four-link chain, and pins connecting each link at its opposite ends with the opposite ends of the two next adjacent links, said pins engaging in the radial slots of the first member, the pivot pins for each link member and the pivotal axis of each link member being disposed in a straight line.

17. An equalizer for universal joints comprising a rotary member having four radial slots spaced equi-angularly about its axis, two roller carriers mounted to be coaxial with said member and movable relative to each other and to said member about their common axis, each roller carrier having two diametrically opposite arms projecting outwardly from its axis, a roller rotatably mounted on each arm, a link pivoted on each arm midway of its length, the pivotal axes of the several links being parallel to said common axis, each of said links being pivotally connected at its opposite ends to the two next adjacent links, and a member carried at the point of pivotal connection of each pair of links which engages in one of the slots in said rotary member.

18. An equalizer for universal joints comprising a rotary spider having four radial slots therein, two members mounted coaxial with said spider and movable relative to each other and to said spider about said common axis, a closed four part linkage connecting said members with the spider, said linkage comprising four links, two of which are pivotally mounted on each of said two members at opposite sides of said common axis, opposite ends of each link being pivotally connected to the two next adjacent links, and rollers mounted at the points of pivotal connection of the links, said rollers engaging in the radial slots of the spider.

19. A universal joint drive comprising two end members, a pair of coaxial intermediate connecting members movable relative to one another about their common axis, each connecting member having a pair of diametrically opposite guide channels extending axially thereof, four rollers mounted on one end member to rotate about axes which extend radially of and intersect the axis of said one end member and engaging in said guide channels adjacent one end of said channels, and four other rollers mounted on radial axes which intersect the axis of said other end member for engagement with said guide channels adjacent the opposite end of said channels, the parts embodying the radial axes of said four other rollers being operatively connected with said other end member.

20. A universal joint drive comprising two spaced rotatable end members, two holders mounted on one of said end members for relative oscillation about the axis of said one end member, each holder having a pair of coaxial pivots lying at opposite sides of said axis and radial of said axis, a pair of parts rotatably mounted on each of said pair of pivots, guides having two pairs of straight ways engaged by said two pairs of parts, all of said ways being disposed about a common axis and extending axially thereof, said guides extending from one of said end members to the other, and means for pivotally connecting said guides with the other of said end members to transmit torque therebetween.

21. A universal joint drive with two spaced universal joints, each of said joints comprising a rotatable end member, holders with radial pivots mounted on each of said end members, said pivots being arranged in coaxial pairs, a pair of parts rotatably mounted on each of said pairs of pivots, a plurality of coaxial connecting members mounted on each other for relative oscillation about their common axis and extending from one end member to the other, said connecting members having pairs of straight guide-ways engaged by said pairs of parts.

22. A universal joint comprising an end member, a pair of holders mounted on said end member to be coaxial therewith and rotatable relative to one another about the axis of said end member, a pair of parts journaled coaxially on each holder for rotation about an axis radial of the axis of said end member, a plurality of pairs of parallel straight ways disposed about a common axis, each pair of which is engaged by one of said pairs of parts, and a four-bar linkage having parallel link pivots interconnecting said end member and said holders to transmit the average motion of said holders to and from said end member.

References Cited in the file of this patent

UNITED STATES PATENTS

| Number | Name | Date |
| --- | --- | --- |
| 1,498,678 | Chavier | June 24, 1924 |
| 2,102,973 | Porsche | Dec. 21, 1937 |
| 2,186,846 | Trobojevich | Jan. 9, 1940 |
| 2,329,903 | Horne | Sept. 21, 1943 |

FOREIGN PATENTS

| Number | Country | Date |
| --- | --- | --- |
| 250,987 | Switzerland | 1948 |